(12) United States Patent
Herntier et al.

(10) Patent No.: US 7,770,964 B2
(45) Date of Patent: Aug. 10, 2010

(54) SPRING STRUT MOUNTING

(75) Inventors: Matthias Herntier, Wurmberg (DE); Siegfried Walter, Leonberg (DE); Leszek Wrobel, Rutesheim (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 428 days.

(21) Appl. No.: 11/944,926

(22) Filed: Nov. 26, 2007

(65) Prior Publication Data
US 2008/0122146 A1 May 29, 2008

(30) Foreign Application Priority Data
Nov. 25, 2006 (DE) ........................ 10 2006 055 730

(51) Int. Cl.
*B60G 13/00* (2006.01)
(52) U.S. Cl. ............. 296/193.01; 296/192; 296/193.09; 280/124.109; 280/788
(58) Field of Classification Search ............ 296/193.06, 296/193.09, 203.02, 192, 187.09, 187.1, 296/187.12, 193.05, 203.03, 198, 30, 187.08, 296/193.07; 180/89.1; 280/124.109, 788, 280/781, 287, 124.147, 124.15
See application file for complete search history.

(56) References Cited
U.S. PATENT DOCUMENTS
3,625,561 A 12/1971 Huber 6,209,950 B1 4/2001 Hanyu
6,773,057 B2 8/2004 Nomura
2005/0046237 A1 * 3/2005 Miyoshi et al. ........ 296/203.02
2006/0103163 A1 5/2006 Rech-Linker et al.

FOREIGN PATENT DOCUMENTS

| DE | 1680014 | | 1/1972 |
|----|---------|---|--------|
| DE | 2713604 | A1 | 10/1978 |
| DE | 4138395 | A1 | 6/1992 |
| DE | 19847876 | A1 | 4/2000 |
| DE | 10103252 | A1 * | 8/2002 |
| DE | 10232329 | A1 | 2/2004 |
| DE | 102006008667 | A1 | 9/2007 |
| EP | 1400437 | A2 | 3/2004 |
| FR | 2001084 | | 9/1969 |

OTHER PUBLICATIONS

German Search Report dated Nov. 25, 2008.
European Search Report dated Feb. 9, 2009.

* cited by examiner

*Primary Examiner*—Patricia L Engle
*Assistant Examiner*—SunSurraye Westbrook

(57) ABSTRACT

A spring strut mounting for holding an upper end of a spring strut of a motor vehicle contains a spring strut dome with an articulation point for articulatedly connecting the upper end of the spring strut. The spring strut mounting further has a lower dome carrier which can be connected to a longitudinal member of the motor vehicle, and an upper dome carrier which can be connected to an A pillar of the motor vehicle, with the upper dome carrier engaging over the articulation point.

13 Claims, 2 Drawing Sheets

SPRING STRUT MOUNTING

CROSS-REFERENCE TO RELATED APPLICATION

This application claims the priority, under 35 U.S.C. §119, of German application DE 10 2006 055 730.1, filed Nov. 25, 2006; the prior application is herewith incorporated by reference in its entirety.

BACKGROUND OF THE INVENTION

Field of the Invention

The present invention relates to a spring strut mounting for a motor vehicle, in particular a passenger vehicle. The spring strut mounting holds an upper end of a spring strut of the motor vehicle and has a spring strut dome with an articulation point for articulatedly connecting the upper end of the spring strut. The spring strut mounting further has a lower dome carrier which can be connected to a longitudinal member of the motor vehicle, and an upper dome carrier which can be connected to an A pillar of the motor vehicle.

A front wheel of the motor vehicle is supported on the vehicle by a spring strut, which can for example contain one or more mechanical, hydraulic and/or electromechanical springs and/or dampers. For this purpose, an upper end of the spring strut is articulatedly connected to a spring strut dome of a spring strut mounting and is supported on an articulation point.

Here, in a mechanical idealization, the articulation point contains an in reality linear or areal contact between the spring strut and spring strut dome, with it being equally possible for the spring strut to be articulatedly connected in a fixed or movable fashion to the spring strut dome. If, for example, an upward-projecting pin of the upper end of the spring strut is inserted through a through bore in the spring strut dome and screwed to the latter, then the articulation point is situated at the point at which the spring strut axis passes through the plane of the spring strut dome.

U.S. patent disclosure No. 2005/004237 A1 discloses a spring strut mounting in which a spring strut dome with an upper dome carrier, which is fastened to the spring strut dome laterally adjacent to the articulation point, is connected to an A pillar of the motor vehicle. U.S. Pat. No. 6,209,950 B1 discloses a similar spring strut mounting in which the spring strut dome is additionally supported by a lower dome carrier on a longitudinal member of the motor vehicle.

Here, a force which is introduced by the spring strut into the spring dome in the direction of the spring strut longitudinal axis disadvantageously generates a torsional moment on account of the lateral configuration of the upper dome carrier adjacent to the articulation point, which torsional moment loads the upper dome carrier in addition to the bending moment caused by the force.

Published, non-prosecuted German patent application DE 41 38 395 A1 likewise discloses a spring strut mounting in which a spring strut dome is supported by a lower dome carrier against the longitudinal member and is connected by a separate, upper dome carrier to the A pillar. The separate, upper dome carrier which is connected to the spring strut dome is embodied as a bent extrusion-molded part, in order to bend toward the vehicle center in a controlled fashion in the event of a frontal collision. Here, too, the force which is introduced from the spring strut into the articulation point of the spring strut dome brings about a torsional moment in the upper dome carrier which is connected laterally to the articulation point.

Published, non-prosecuted German patent application DE 1 680 014 A discloses a spring strut mounting which is formed directly in a lateral wheel running plate. A separate stiffening element is fastened at the center of the vehicle to a bulkhead and in the region of an upper articulation point of a spring strut, and is formed with constrictions so that, in the event of a certain compressive force being exceeded, the stiffening element bends and does not impart any excessive forces to the bulkhead. Forces introduced from the spring strut into the articulation point in the direction of the spring strut axis therefore cannot be absorbed by the stiffening element, it serves primarily for stiffening in the vehicle longitudinal and transverse directions.

Published, non-prosecuted German patent application No. DE 27 13 604 A finally discloses a spring strut mounting having a spring strut dome which is connected by a lower dome carrier to a longitudinal member and by an upper dome carrier to an A pillar. The two dome carriers are connected to the annular spring strut dome laterally at its outer periphery and run obliquely downward from the latter, so that, in the event of a frontal collision, the dome carriers are set upright and the spring strut dome deflects upward.

In the spring strut mounting, too, it is also unfavorably necessary for a force which is introduced via its articulation point into the spring strut dome in the direction of the spring strut axis to be transmitted as a shear stress into the upper dome carrier in the connecting point between the spring strut dome and the upper dome carrier, so that the strength and stiffness of the spring strut support is limited by the connecting point.

BRIEF SUMMARY OF THE INVENTION

It is accordingly an object of the invention to provide a spring strut mounting that overcomes the above-mentioned disadvantages of the prior art devices of this general type, in which forces which are introduced from a spring strut can be better absorbed in the vehicle.

With the foregoing and other objects in view there is provided, in accordance with the invention, a spring strut mounting for holding an upper end of a spring strut of a motor vehicle. The spring strut mounting contains a spring strut dome having an articulation point for articulatedly connecting the upper end of the spring strut, a lower dome carrier for connecting to a longitudinal member of the motor vehicle, and an upper dome carrier for connecting to an A pillar of the motor vehicle. The upper dome carrier engages over the articulation point from above and has an upwardly open U-shaped profile or π-shaped profile. The profile has sidewalls and a base, on the base a cutout is formed therein for articulatedly connecting the upper end of the spring strut. The profile further has reinforcement ribs connected to the base and/or the side walls.

A spring strut mounting according to the invention contains a spring strut dome having at least one articulation point for articulatedly connecting the upper end of a spring strut of a motor vehicle. Here, the articulated connection can equally be fixed, for example by a screw connection and/or one or more projections being held in a form-fitting manner in corresponding cutouts or openings, or articulated, for example by a ball joint or hinge joint.

Here, an articulation point refers in particular to a point at which a force is introduced in the longitudinal direction of the spring strut from the upper end of the spring strut into the spring strut dome. An articulation point of this type can lie for example on or in the vicinity of the central line of a pin of the upper end of the spring strut, which pin engages through a cutout in the spring strut dome. It is possible in particular for the point at which the spring strut axis extends through the spring strut dome to form an articulation point within the context of the present invention. In addition to the articulation point which the present invention refers to, a spring strut can additionally be fastened to the spring strut dome by further fastening points, by which forces are likewise transmitted from the spring strut to the spring strut dome.

The spring strut dome is supported by a lower dome carrier on a longitudinal member of the motor vehicle, to which longitudinal member the lower dome carrier can be fixedly or detachably connected, for example screwed, riveted, adhesively bonded and/or welded. The lower dome carrier can equally be formed in one piece with the longitudinal member or a part of the longitudinal member.

The spring strut dome can be connected by an upper dome carrier to an A pillar of the motor vehicle. For this purpose, it is for example possible for a distal end, in particular a flange, of the upper dome carrier to be screwed, riveted, adhesively bonded and/or welded to the A pillar or to a metal sheet which surrounds the latter.

According to the invention, the upper dome carrier engages over at least one articulation point at which the upper end of the spring strut is articulatedly connected, so that the forces which engage at the articulation point can be introduced from below into the upper dome carrier.

A spring strut transmits primarily forces in its longitudinal direction, with which a front wheel is supported against the vehicle body. Although forces in other directions and torques can additionally occur and be introduced into the vehicle body as transverse forces, bending or torsional moments in the articulation point and/or via additional fastening points, these are however generally smaller than the main load in the spring strut longitudinal direction. The main load is now advantageously introduced from below into the upper dome carrier which, for this purpose, engages over the corresponding articulation point. In this way, no torsional moments or only small torsional moments occur in the upper dome carrier, which torsional moments would cause intense twisting in particular of open profiles.

In addition, the upper part of the spring strut is also supported in a form-fitting manner from below against the upper dome carrier which engages over it. In this way, transition regions between the spring strut dome, to which the spring strut is articulatedly connected, and the upper dome carrier are advantageously not loaded with shear or are loaded with shear only to a small degree.

The main load of the spring strut, generally in the direction of its longitudinal axis, can therefore be introduced particularly favorably into the upper dome carrier and transmitted from the latter to the A pillar which is connected thereto. In this way, the entire spring strut mounting, in particular its upper dome carrier and the attachment thereof to the A pillar, can be of a lighter configuration, which reduces the overall vehicle weight. In addition or alternatively, the stiffness of the spring strut mounting can advantageously be increased.

The articulation point advantageously lies on or in the vicinity of the upper dome carrier, which reduces the torsional moments which are induced by forces in the longitudinal direction of the spring strut, and this likewise advantageously increases the stiffness of the spring strut mounting.

In one preferred embodiment of the present invention, the upper dome carrier extends substantially along the shortest path between the articulation point and the A pillar. In this way, bending and torsional moments which occur in the upper dome carrier and its connection to the A pillar, which bending and torsional moments result from the longitudinal force which acts in the direction of the spring strut axis and is introduced at the articulation point, are reduced. On the other hand, the length of the upper dome carrier is also advantageously minimized. Finally, an upper dome carrier which extends substantially along the shortest path also reduces the available engine space to the least possible degree.

Here, the shortest path refers to that path which results taking into consideration the other boundary conditions such as for example units which must be bypassed in the front end of the vehicle. The shortest path can in particular be the direct connection between the articulation point and the A pillar. The upper transverse member need not follow the shortest path exactly in the preferred embodiment; small deviations, which result for example from production or assembly-related aspects, are permissible.

The upper dome carrier extends outward from the articulation point toward the A pillar in the vehicle transverse direction. In this way, the upper dome carrier impairs the space available in the front end of the vehicle only to a small degree. If, in the event of a frontal collision, the spring strut mounting together with the longitudinal member to which it is connected is pushed rearward in the vehicle longitudinal direction, the upper dome carrier which is guided away outward can advantageously break away outward, so that they do not enter into the passenger compartment. In this way, occupant safety is increased. Finally, if the A pillars are mounted in front of a front bulkhead, then the length of the upper dome carrier can advantageously be shortened by the guidance away outward.

The articulation point is advantageously disposed substantially at the dome central point. In this way, the forces which are introduced from the upper end of the spring strut are introduced as uniformly as possible in the spring strut longitudinal direction, and can be distributed homogeneously in the spring strut dome.

In one preferred embodiment of the present invention, the upper dome carrier contains an upwardly open U-shaped or π-shaped profile, on the base, which is situated between two side walls, of which is formed a cutout for articulatedly connecting the upper end of the spring strut. An open profile of the type provides a high level of bending stiffness at a low weight, and can therefore transmit forces in the spring strut longitudinal direction, which load the profile as transverse forces, in a particularly suitable fashion into the A pillar. Since, according to the invention, the upper dome carrier engages over the articulation point and the articulation point lies in the interior of the profile, no torsional moments or only small torsional moments which would cause intense twisting of an open profile of the type occur at the same time. The articulation point can particularly preferably be disposed in the shear center of the profile or its vicinity.

Reinforcement ribs can be formed in the profile, which reinforcement ribs extend between the side walls themselves and/or between the side walls and the base of the profile. In this way, it is possible to obtain a high level of stiffness of the upper dome carrier at a low weight.

The lower dome carrier preferably has, at its end which faces toward the longitudinal member, an angle flange for form-fitting support on the longitudinal member. By the angle flange, the support advantageously acts here in two different spatial directions and thus increases the strength and stiffness of the spring strut mounting. In addition, the angle flange facilitates correct position of the spring strut mounting on the longitudinal member, and thus simplifies its assembly.

In one preferred embodiment, the spring strut dome and the upper dome carrier are formed in one piece with one another. In this way, connecting points between the spring strut dome and the upper dome carrier are dispensed with, and the spring strut mounting can at the same time be formed to be lighter as a whole, wherein at the same time, forces which are introduced from the spring strut via the spring strut dome into the upper dome carrier in the direction of the spring strut axis are transmitted in a favorable force flow which is advantageously not disturbed or disturbed to only a small degree by notching influences. For this purpose, the upper dome carrier can merge, at its end facing away from the A pillar, directly into the spring strut dome with which it engages over the articulation point.

For the same reasons, the spring strut dome can additionally or alternatively also be formed in one piece with the lower dome carrier, so that the overall weight of the spring strut mounting is reduced, and the forces which are introduced from the spring strut dome into the lower dome carrier need not be transmitted via separate connecting points, which would disturb the force flow. In addition, the single-piece formation of spring strut dome and/or lower dome carrier can reduce the production expenditure.

In the above-described embodiment, the spring strut mounting is advantageously produced as a cast part, in particular as an aluminum case part. The formation as a cast part permits, in a simple and cost-effective way, the production of homogeneous-material spring strut mountings, which can also have rounded portions or free-form faces which can be produced only with difficulty in the case of cutting production or composition from metal sheets or the like. Aluminum, which is to be understood in the present case to also include aluminum alloys, offers a high strength at a low weight, and thus advantageously reinforces the spring strut mounting.

The lower dome carrier can be formed in one piece with the longitudinal member or a part of the longitudinal member. As a result, the separate attachment of the spring strut arrangement to the longitudinal member is dispensed with, which can likewise reduce weight and production expenditure, while on the other hand forces can be introduced particularly favorably into the longitudinal member.

In one preferred embodiment, the spring strut mounting has a dome strut which can be connected to a vehicle body, in particular a bulkhead, a cowl and/or a transverse member, which dome strut is fastened to the spring strut dome. A dome strut of this type connects the spring strut dome, which is already attached by the upper dome carrier to the A pillar, additionally to a further element of the vehicle body, and thus advantageously increases the overall stiffness of the spring strut mounting. Here, the dome strut preferably extends inward in the vehicle transverse direction, so that it, together with an outwardly extending upper dome carrier, forms a bipod which defines the articulation point on the vehicle body and can transmit forces into the articulation point particularly effectively. In addition, it is also thus possible to predefine a deflecting kinematic behavior with which the spring strut mounting moves in the event of a frontal collision.

A dome strut of this type can be detachably fastened, for example screwed, to the spring strut dome and to the vehicle body. This allows the removal of the dome strut in order to create access to that part of the front end of the vehicle which is situated below or behind the dome strut. A dome strut of the type is equally generally released at the detachable connecting points, for example the screw connections, in the event of an offset, caused by a frontal collision, of the spring strut mounting in the vehicle longitudinal direction. It can thus be prevented that the dome struts enter into the passenger compartment and pose a risk to the passengers.

A spring strut mounting arrangement having two spring strut mountings according to the present invention can also contain a transverse strut which connects the dome struts of the two spring strut mountings to one another. In this way, the stiffness of the overall front end of the vehicle is advantageously increased. It is possible in particular for different wheel loads which are introduced via the spring struts to be partially compensated by the transverse strut without loading the rest of the vehicle body. In addition, the transverse strut prevents an excessive penetration of the dome strut, which is connected thereto, into the passenger compartment, and thus increases the occupant safety yet further. For this purpose, the transverse strut can be fixedly connected to the dome struts, for example formed integrally with or welded to the latter.

According to a further embodiment, the spring strut mounting has lugs in each case on an inner face diametrically oppositely at both sides of the through bore, which lugs between them hold links of a wheel suspension so as to mount the latter. In this way, a spring strut support and a link mount are advantageously integrated in one cast part. In addition, an upturned holding lug for torque support of a motor is arranged at the edge side on a support plate, which holds the through bore, of the spring strut mounting, which likewise results in an integration of the support in the cast part of the spring strut support with a simple configuration, and therefore no additional support and holding points on need be created on the vehicle body.

Other features which are considered as characteristic for the invention are set forth in the appended claims.

Although the invention is illustrated and described herein as embodied in a spring strut mounting, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
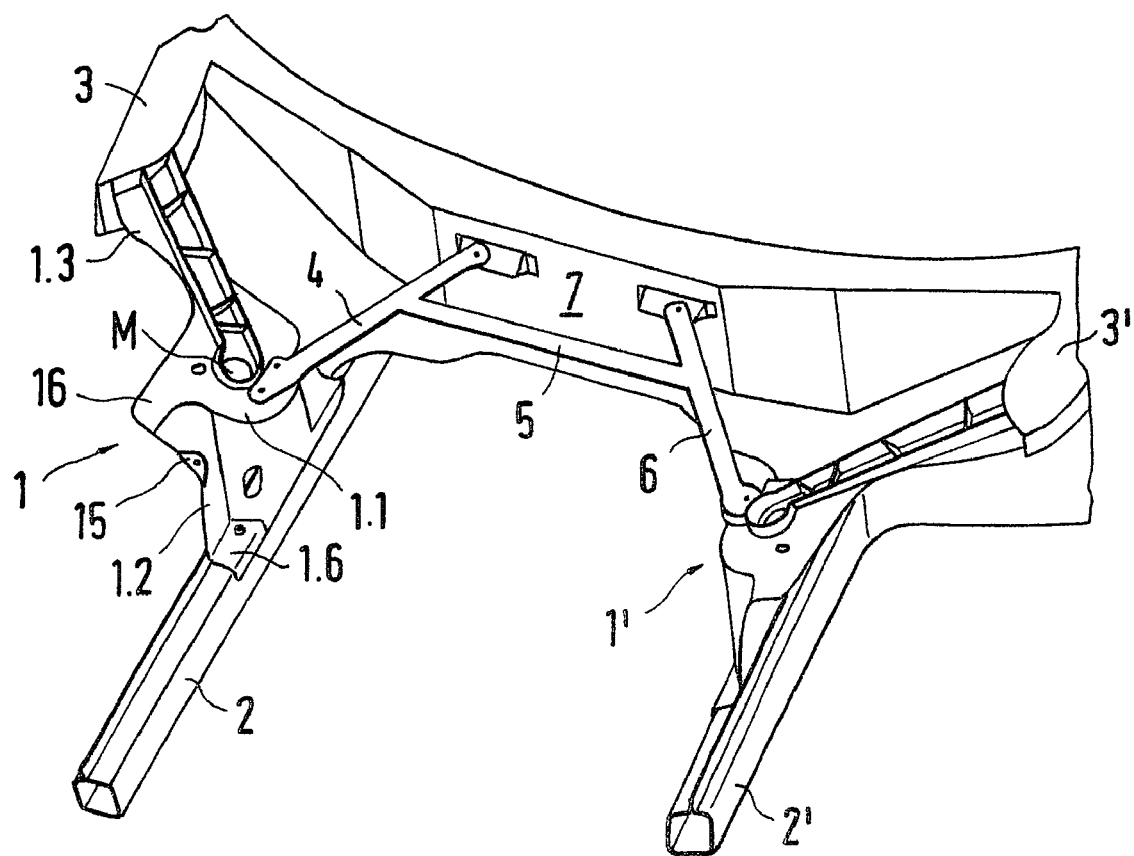
FIG. 1 is a diagrammatic, perspective view of a part of a front end of a vehicle with two spring strut mountings according to one embodiment of the invention.
Figure 2:
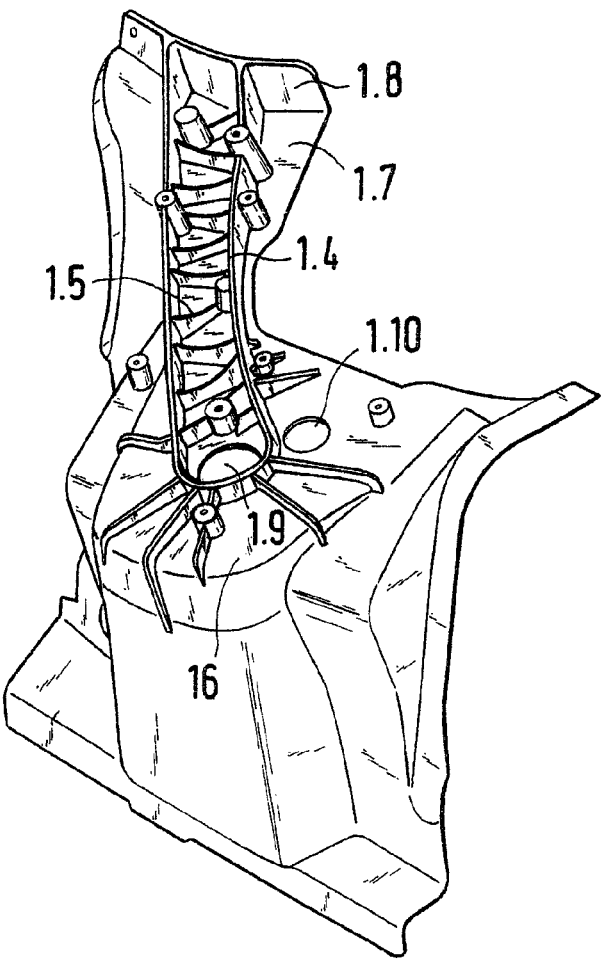
FIG. 2 is a diagrammatic, perspective view of the left-hand spring strut mounting from FIG. 1 from another angle.
Figure 3:
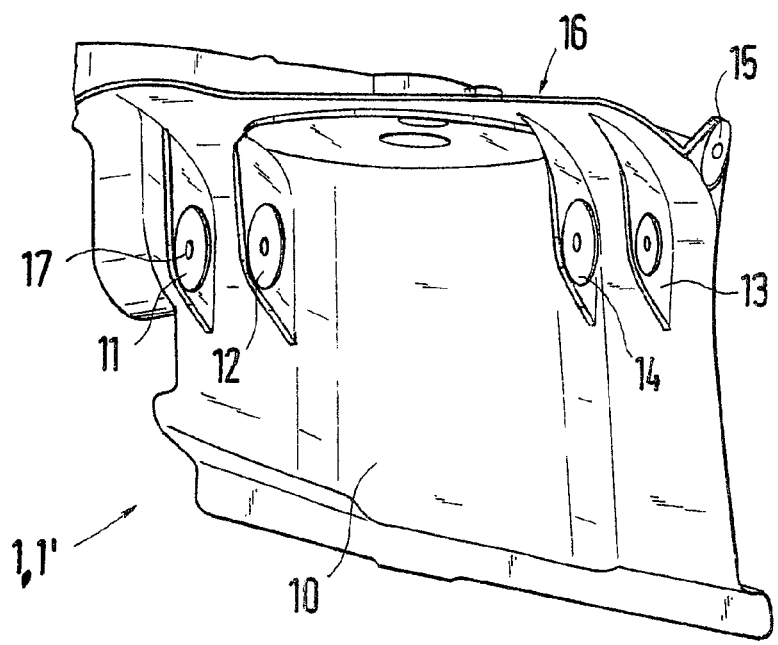
FIG. 3 is a diagrammatic, perspective view of the spring strut mounting from the inside, with lugs for holding links, and a holding lug for a torque support.

Referring now to the figures of the drawing in detail and first, particularly, to FIG. 1 thereof, there is shown perspective view from obliquely above, a part of a front end of a vehicle with a right-hand and left-hand longitudinal member 2, 2' which are connected to one another by a bulkhead 7 in a transverse direction of the vehicle. A right-hand and a left-hand A pillar 3, 3' close off the bulkhead 7 at each side and are fixedly connected to the latter. Here, each A pillar contains, in a way which is not illustrated, a vehicle-inner-side metal sheet and a vehicle-outer-side metal sheet which is connected thereto.

The front end of the vehicle also contains a right-hand spring strut mounting 1 in a configuration according to the present invention, and a left-hand spring strut mounting 1' which is of mirror-symmetrically identical configuration to the right-hand spring strut mounting 1.

The spring strut mounting 1 and 1' contains a spring strut dome 1.1 for holding an upper part of a non-illustrated spring strut. The spring strut dome 1.1, which is substantially plate-shaped in the exemplary embodiment, is adjoined in one piece by a lower dome carrier 1.2, with which the spring strut mounting 1 and 1' is supported on the longitudinal member 2. For this purpose, a distal end, which faces away from the spring strut dome 1.1, is formed with an angle flange 1.6 which is supported on the longitudinal member 2 and 2' with two flange faces which are inclined toward one another, and is screwed to the longitudinal member 2, 2' in an upper flange face.

In a modification of the exemplary embodiment which is not illustrated, the lower dome carrier 1.2 and a front part of the longitudinal member 2, 2' are likewise formed in one piece with one another. The front part of the longitudinal member is connected, for example plugged, screwed and/or welded, at approximately the level of the bulkhead 7, to a rear part to form the entire longitudinal member.

An upper dome carrier 1.3 likewise adjoins the spring strut dome 1.1 in one piece. Here, the upper dome carrier 1.3 contains an upwardly-open π-shaped profile 1.4 whose base and side walls are connected to one another by reinforcement ribs 1.5. At its distal end which faces away from the spring strut dome 1.1, the upper dome carrier 1.3 has an end flange 1.8 which is connected to the π-shaped profile 1.4, which end flange 1.8 is, in a form-fitting manner (in a way not illustrated in any more detail), supported on and attached to the A pillar 3.

In its cover, the spring strut dome 1.1 has two through bores 1.9, 1.10, the larger 1.9 of which is provided for holding a pin-shaped upper end of the non-illustrated spring strut which is screwed to the spring strut mounting. The smaller bore 1.10 can be utilized for attaching a carrier of the chassis suspension or for the leadthrough of cables from the front end of the vehicle into the wheel loads.

The π-shaped profile 1.4 engages around and encloses the larger bore 1.9 which is provided for holding the upper end of the spring strut, in such a way that the bore 1.9 also extends through the inner part of the base 1.7 of the π-shaped profile 1.4 between the side walls of the latter. An articulation point M at which a force which acts in the longitudinal direction of the spring strut is introduced into the spring strut dome 1.1, lies in the point at which the spring strut axis passes through the spring strut dome 1.1 or the base 1.7 of the π-shaped profile 1.4, i.e. in the center of the bore 1.9. The latter is itself disposed substantially at the central point of the plate-shaped spring strut dome 1.1.

The upper end of the spring strut is thus supported in a form-fitting manner from below on the upper dome carrier 1.3, in particular on its π-shaped profile 1.4, which for this purpose engages over the articulation point from above. The forces which are introduced are transmitted substantially as bending moments into the A pillar 3, 3' without the open π-shaped profile 1.4 being loaded by relatively large torsional moments and twisted. The ribs 1.5 and that part of the base 1.7 which projects beyond the sides additionally counteract twisting of this type. This results in very rigid support of the spring strut on the A pillar 3, 3' with a simultaneously low weight of the spring strut mounting 1, 1'.

As can be seen in particular in FIG. 1, the upper dome carrier 1.3 extends substantially along the shortest path between the articulation point M and the A pillar 3, 3', in the exemplary embodiment on a substantially horizontal, straight or only slightly curved line through the articulation point M and the attachment to the A pillar 3, 3'.

In this way, the bending moments which act in the upper dome carrier 1.3 and are transmitted to the A pillar 3, 3', which bending moments are introduced into the upper dome carrier by the force in the longitudinal direction of the spring strut, are minimized, since the effective lever arm is shortened in relation to an attachment to the A pillar situated further up or further down. At the same time, the spring strut mounting can be of very compact and light construction and takes up only a small amount of space in the front end of the vehicle.

As can likewise be seen from FIG. 1, the upper dome carrier 1.3 extends outward from the articulation point M toward the A pillar 3, 3' in the transverse direction of the vehicle. In the case of a frontal collision, the spring strut mounting 1, 1' is offset rearward in the vehicle longitudinal direction. Here, the upper dome carrier 1.3 deviates outward toward the vehicle outer side and does not penetrate into the passenger compartment, so that occupant safety is increased.

The spring strut dome 1.1, the upper dome carrier 1.3 and the lower dome carrier 1.2 are formed in one piece as an aluminum cast part. This results in an equally light and rigid component which requires only a small amount of finishing, for example at the angle flange 1.6, the end flange 1.8 or the bore 1.9.

A tubular dome strut 4 is screwed to the end wall 7 and the spring strut dome 1.1 of the right-hand spring strut mounting 1 and is for this purpose flattened at its ends. In the same way, a further dome strut 6 is screwed to the end wall 7 and to the spring strut dome 1.1 of the left-hand spring strut mounting 1'. The two dome struts 4, 6 are connected to one another by a transverse strut 5 which is welded to the two dome struts 4, 6.

The dome strut 4 forms, together with the upper dome carrier 1.3, a bipod, with which the articulation point M is supported on the vehicle body both in the vehicle longitudinal and also transverse direction. In this way, particularly rigid and fixed support of the forces which are introduced in the direction of the spring strut axis is obtained, while at the same time, by the framework arrangement, the bending moment which is to be transmitted in the upper dome carrier 1.3 and the dome strut 4 is reduced. The dome carrier and strut can thus be loaded in each case in an optimum fashion.

The transverse strut 5 additionally increases the stiffness of the front end of the vehicle in the vehicle transverse direction. At the same time, different wheel loads can in any case be partially compensated by the transverse strut 5, so that the vehicle body is loaded more uniformly as a whole.

In the case of a frontal collision, the strut arrangement, composed of the dome struts 4, 6 and the transverse strut 5 which is welded thereto and which in itself forms a compact and rigid component, is released from the spring strut domes at the screw connections if a spring strut mounting is pushed forcibly in the direction of the passenger compartment. This prevents the strut arrangement from entering into the passenger compartment and thereby posing a risk to passengers. If the predetermined breaking points do not open and the dome strut 4 and/or the dome strut 6 penetrates into the passenger compartment, the transverse strut 5, which then comes into form-fitting contact against the bulkhead 7, prevents a further penetration and thus additionally increases occupant safety.

The spring strut mounting 1, 1' is preferably composed of a cast part which, at the inside, has in each case a pair of lugs 11, 12 and 13, 14 on an inner face 10, which lugs between them hold a wheel control link a wheel suspension so as to mount the latter. For this purpose, the lugs 11 to 14 project out of the plane of the inner face 10 and have bores 17, which are aligned in the same direction, for a non-illustrated bearing journal. In addition, an upturned holding lug 15 is integrally formed on the cast part of the spring strut mounting 1.1', which holding lug 15 is arranged at the edge side of the support plate 16 of the spring strut mounting and serves for a connection for a torque support of a non-illustrated motor.

The invention claimed is:

1. A spring strut mounting for holding an upper end of a spring strut of a motor vehicle, the spring strut mounting comprising:
    a spring strut dome having an articulation point for articulatedly connecting the upper end of the spring strut;
    a lower dome carrier for connecting to a longitudinal member of the motor vehicle; and
    an upper dome carrier for connecting to an A pillar of the motor vehicle, said upper dome carrier engaging over said articulation point from above and having an upwardly open profile selected from the group consisting of U-shaped profiles and π-shaped profiles, said profile having sidewalls and a base, on said base a cutout is formed therein for articulatedly connecting the upper end of the spring strut, said profile further having reinforcement ribs connected to at least one of said base and said side walls.

2. The spring strut mounting according to claim 1, wherein said upper dome carrier extends substantially along a shortest path between said articulation point and the A pillar.

3. The spring strut mounting according to claim 1, wherein said upper dome carrier extends outward from said articulation point in a transverse direction of the motor vehicle.

4. The spring strut mounting according to claim 1, wherein said articulation point is disposed substantially at a dome central point.

5. The spring strut mounting according to claim 1, wherein at least one of said spring strut dome, said upper dome carrier and said lower dome carrier are formed in one piece with one another.

6. The spring strut mounting according to claim 1, wherein said lower dome carrier has, at its end which faces toward the longitudinal member, an angle flange for form-fitting support on the longitudinal member.

7. The spring strut mounting according to claim 1, wherein said lower dome carrier and the longitudinal member are formed in one piece with one another.

8. The spring strut mounting according to claim 1, further comprising a dome strut for connecting to at least one of a vehicle body, a bulkhead, a cowl and a transverse member, said dome strut fastened to said spring strut dome.

9. The spring strut mounting according to claim 8, wherein said dome strut extends inward from said spring strut dome in a transverse direction of the motor vehicle.

10. The spring strut mounting according to claim 1, wherein at least one of said spring strut dome, said upper dome carrier and said lower dome carrier are formed in one piece with one another as a cast part.

11. A spring strut mounting configuration, comprising:
    two spring strut mountings for holding an upper end of a spring strut of a motor vehicle, said spring strut mountings each containing:
        a spring strut dome having an articulation point for articulatedly connecting the upper end of the spring strut;
        a lower dome carrier for connecting to a longitudinal member of the motor vehicle;
        an upper dome carrier for connecting to an A pillar of the motor vehicle, said upper dome carrier engaging over said articulation point from above and having an upwardly open profile selected from the group consisting of U-shaped profiles and π-shaped profiles, said profile having sidewalls and a base, on said base a cutout is formed therein for articulatedly connecting the upper end of the spring strut, said profile further having reinforcement ribs connected to at least one of said base and said side walls;
        a dome strut for connecting to at least one of a vehicle body, a bulkhead, a cowl and a transverse member, said dome strut fastened to said spring strut dome; and
    a transverse strut connecting said dome struts of said two spring strut mountings to one another.

12. The spring strut mounting configuration according to claim 11, wherein said spring strut mountings each have a through bore formed therein, an inner face and lugs integrally formed on said inner face diametrically oppositely at both sides of said through bore, said lugs between them hold links of a wheel suspension so as to mount the wheel suspension.

13. The spring strut mounting configuration according to claim 11, wherein said spring strut mountings further have:
    a support plate in which said through bore is formed; and
    an upturned holding lug for torque support of a motor disposed at an edge side on said support plate.

* * * * *